United States Patent
Collet et al.

(10) Patent No.: US 9,058,517 B1
(45) Date of Patent: Jun. 16, 2015

(54) PATTERN RECOGNITION SYSTEM AND METHOD USING GABOR FUNCTIONS

(71) Applicants: Frederic Collet, Etterbeek (BE); Jordi Hautot, Neupre (BE); Michel Dauw, Machelen (BE); Pierre De Muelenaere, Court-Saint-Etienne (BE); Olivier Dupont, Sombreffe (BE); Gunter Hensges, Wurselen (DE)

(72) Inventors: Frederic Collet, Etterbeek (BE); Jordi Hautot, Neupre (BE); Michel Dauw, Machelen (BE); Pierre De Muelenaere, Court-Saint-Etienne (BE); Olivier Dupont, Sombreffe (BE); Gunter Hensges, Wurselen (DE)

(73) Assignee: I.R.I.S., Mont-Saint-Guibert (BE)

( * ) Notice: Subject to any disclaimer, the term of this patent is extended or adjusted under 35 U.S.C. 154(b) by 0 days.

(21) Appl. No.: 14/254,039

(22) Filed: Apr. 16, 2014

(51) Int. Cl.
 *G06K 9/00* (2006.01)
 *G06F 17/30* (2006.01)
 *G06K 9/46* (2006.01)
 *G06F 17/27* (2006.01)

(52) U.S. Cl.
 CPC .......... *G06K 9/0053* (2013.01); *G06K 9/00503* (2013.01); *G06K 9/00536* (2013.01); *G06F 17/30247* (2013.01); *G06K 9/46* (2013.01); *G06K 9/4614* (2013.01); *G06F 17/2765* (2013.01); *G06K 9/4623* (2013.01); *G06F 17/27* (2013.01); *G06K 9/00523* (2013.01)

(58) Field of Classification Search
 CPC ................................................. G06K 9/00422
 USPC ......... 382/100–102, 105, 112–114, 135–138, 382/160, 161, 181, 182, 185–187, 190, 198, 382/200, 209, 224, 279, 321
 See application file for complete search history.

(56) References Cited

U.S. PATENT DOCUMENTS

| 7,174,044 B2 * | 2/2007 | Ding et al. | 382/210 |
|---|---|---|---|
| 7,221,797 B2 * | 5/2007 | Koshizen et al. | 382/190 |
| 7,379,568 B2 * | 5/2008 | Movellan et al. | 382/118 |
| 8,509,538 B2 * | 8/2013 | Li et al. | 382/190 |
| 2005/0025337 A1 * | 2/2005 | Lu et al. | 382/100 |
| 2010/0329562 A1 * | 12/2010 | Zhu | 382/187 |

OTHER PUBLICATIONS

Thomas Weldon and William E. Higgins, "Designing multiple Gabor filters for multitexture image segmentation", Optical Engineering, vol. 28, Issue 9, Sep. 1999, pp. 1478-1489.*

Y. Hamamoto, S. Uchimura, K. Masamizu, and S. Tomita, "Recognition of Handprinted Chinese Characters Using Gabor Features", IEEE, Proceedings of the Third International Conference on Document Analysis and Recognition, vol. 2, Aug. 1995, pp. 819-823.*

(Continued)

*Primary Examiner* — Eric Rush
(74) *Attorney, Agent, or Firm* — Jerold L. Schneider; Schneider Rothman Intellectual Property Law Group PLLC (57) ABSTRACT

A pattern recognition system and method which generates a feature vector by multiplying an image vector with a sparse matrix. The sparse matrix is generated from a Gabor function which is a sinusoidal wave multiplied by a Gaussian function. The Gabor function is a function of a set of parameters including a parameter related to the direction of the sinusoidal wave, a parameter related to a center of the Gabor function, and a parameter related to a wavelength of the sinusoidal wave. The wavelength takes at least two values, with a first wavelength value lower than or substantially equal to the distance between two adjacent centers of the Gabor function, and the first wavelength value is lower than a second wavelength value and higher than or substantially equal to half the second wavelength value.

6 Claims, 4 Drawing Sheets

(56) References Cited

OTHER PUBLICATIONS

Qiang Huo, Yong He and Zhi-Dan Feng, "High Performance Chinese OCR based on Gabor Features, Discriminative Feature Extraction and Model Training", Proceedings of 2001 IEEE International Conference on Acoustics, Speech, and Signal Processing, vol. 3, 2001, pp. 1517-1520.*

Yoshihiko Hamamoto, Shunji Uchimura, Masanori Watanabe, Tetsuya Yasuda, Yoshihiro Mitani, and Shingo Tomita, "A Gabor Filter-Based Method for Recognizing Handwritten Numerals", Elsevier Science, Pattern Recognition, vol. 31, No. 4, 1998, pp. 395-400.*

Yong Ge, Qiang Huo, and Zhi-Dan Feng, "Offline Recognition of Handwritten Chinese Characters using Gabor Features, CDHMM Modeling and MCE Training", IEEE, International Conference on Acoustics, Speech, and Signal Processing, vol. 1, 2002, pp. I-1053-I-1056.*

Teng Long and Lian-Wen Jin, "Building Compact MQDF Classifier for Off-line Handwritten Chinese Characters by Subspace Distribution Sharing", IEEE, Ninth International Conference on Document Analysis and Recognition, Sep. 2007, pp. 909-913.*

* cited by examiner

PATTERN RECOGNITION SYSTEM AND METHOD USING GABOR FUNCTIONS

FIELD OF THE INVENTION

The invention relates to a pattern recognition system. More specifically, the invention relates to a pattern recognition system using a Gabor function.

BACKGROUND OF THE INVENTION

A pattern recognition system can be an Optical Character Recognition (OCR) system. OCR systems are known. They convert the image of text into machine-readable code by using a character recognition process. In an OCR system, the images of what could be characters are isolated and a character recognition process is used to identify the character.

Known optical character recognition processes generally comprise:
- a normalization step that generates a normalized matrix from an input image;
- a feature extraction step; and
- a classification step to identify the character.

The feature extraction step generates a feature vector that characterizes the input image and the classification step identifies the character starting from this feature vector. In some OCR processes, the feature extraction step involves a filtering with a Gabor filter. The choice of the Gabor filter is key for the OCR process because the Gabor filter determines the feature vector to identify the character. The feature vector has to contain the necessary information to identify the character with high accuracy. A too large feature vector makes the computation slow and a too small feature vector decreases the accuracy of the character identification. Known OCR processes using Gabor filters are too slow or have a too low accuracy. This is especially relevant for identification of Asian characters because of the extremely high number of Asian characters. Another disadvantage of the known Gabor filters is that they do not work adequately with the subsequent classification step.

U.S. Pat. No. 7,174,044B2 discloses a known method for character recognition based on Gabor filters that extracts the information of the specific directions of the characters. This method uses average on regions of Gabor filters and involves a lot of calculation and a large feature vector. This makes OCR processes using this method too slow.

The paper "High performance Chinese OCR based on Gabor features, discriminative feature extraction and model training" from Qiang Huo, Yong Ge and Zhi-Dan Feng in the Proceedings of the IEEE International Conference on Acoustics, Speech, and Signal Processing, 2001, Volume 3, describes a known OCR process for Chinese characters. This method is fast but the recognition accuracy is not extremely high.

The dissertation called "Chinese OCR System Based on Gabor Features and SVM" from DaiWei at the Shanghai Jiaotong University describes another OCR process. SVM stands for "Support Vector Machine", a supervised learning model that uses associated learning algorithms for data analysis and recognition algorithms. Such a SVM system requires a very large learning set that makes it either impractical or inaccurate.

SUMMARY OF THE INVENTION

It is an aim of this invention to provide a pattern recognition method which provides fast and accurate identification of the pattern.

It is another aim of this invention to provide a computer program product for carrying out said pattern recognition system.

These aims are achieved according to the embodiments of the invention.

In an embodiment, the method of identifying a pattern in an input image comprises the steps of:
a) normalizing the input image to a normalized matrix representing a normalized image,
b) generating an image vector from the normalized matrix,
c) multiplying the image vector with a sparse matrix using a matrix vector multiplication to generate a feature vector wherein the sparse matrix is generated from a Gabor function which is a sinusoidal wave multiplied by a Gaussian function and wherein the Gabor function is a function of at least one variable indicating a position in the normalized matrix and of a set of parameters including a parameter related to the direction of the sinusoidal wave, a parameter related to a centre of the Gabor function, and a parameter related to a wavelength of the sinusoidal wave,
d) creating with the feature vector a density of probability for a predetermined list of models,
e) selecting the model with the highest density of probability as the best model, and
f) classifying the best model as the pattern of the input image, wherein there are at least two centres of the Gabor function, and wherein the wavelength takes at least two values, with a first wavelength value lower than or substantially equal to the distance between two adjacent centres of the Gabor function, and the first wavelength value is lower than a second wavelength value and higher than or substantially equal to half the second wavelength value.

It has been found that by a combination of these steps, a fast and accurate pattern recognition method is achieved. In particular, because the feature vector generated in step c) is large enough to make the recognition accurate and is small enough to make the computation of the pattern recognition method fast. Further, choosing two wavelengths of which the shorter one is higher than or equal to half the longer and lower than or equal to the distance between two Gabor function centres, is a advantageous trade-off to keep low the number of wavelengths (and thus the size of the feature vector) and still make the feature vector slightly redundant. This redundancy of the feature vector makes that a character can still be recognized even if the value of a given element of the feature vector is corrupted.

In an embodiment of the invention, the models are characterized by a covariance matrix and an average vector, the density of probability being calculated by the formula:

$$p(r) = \frac{1}{\sqrt{(2\pi)^k |\Sigma|}} \exp\left[-\frac{(r-\mu)^t \sum (r-\mu)}{2}\right]$$

where the symbol r represents the feature vector, the symbol $\Sigma$ represents the covariance matrix, the symbol $\mu$ represents the average vector and k is equal to the number of elements of the feature vector.

In another embodiment, the covariance matrix is approximated. In an embodiment, the traces of the covariance matrices of all models are equal. In an embodiment, all the non-diagonal elements of the covariance matrix are set to zero. It has been found that the characterization of the models by such covariance matrix and average vector and the calculation of the density of probability by this formula, in combination with the method described above, makes the recognition accurate and especially fast.

In an embodiment according to the present invention, the parameter related to the direction of the sinusoidal wave is such that the angles between the possible directions of the sinusoidal wave are substantially equal.

In an embodiment according to the invention, the parameter related to the direction of the sinusoidal wave is an angle. In another embodiment, the sum of the highest value of the angle and the lowest value of the angle is equal to $\pi$ radians. In an embodiment, the angle takes six values.

This choice of values for the parameter related to the direction of the sinusoidal wave gives a good trade-off to achieve a sufficient angular sampling of the normalized image and keep the size of the feature vector small enough to get fast computation of the method.

In another embodiment according to the invention, the Gabor function is a function of at least two parameters related to a centre of the Gabor function. In an embodiment, the parameters related to a centre of the Gabor function are such that the centres of the Gabor function are regularly spaced.

In an embodiment of the invention, one parameters related to a centre of the Gabor function may correspond to a vertical direction in the normalized matrix and one parameters related to a centre of the Gabor function may correspond to an horizontal direction in the normalized matrix. In embodiment, the distance of a first centre of the Gabor function to an edge of the normalized matrix may be substantially equal to half the distance between two adjacent centres of the Gabor function.

This choice of the centres of the Gabor function gives a good sampling of the normalized image and keep the size of the feature vector small enough to get fast computation of the method.

In another embodiment according to the invention, the Gabor function includes a parameter related to the width of the Gaussian function, which may be the standard deviation of the Gaussian function. In an embodiment, the standard deviation of the Gaussian function is lower than the distance between two adjacent centres of the Gabor function and higher than the half distance between two adjacent centres of the Gabor function. This choice of the width of the Gaussian gives a good sampling of the normalized image and keep the size of the feature vector small enough to get fast computation of the method.

In an embodiment according to the invention, pattern is a two-colour pattern, a character, an Asian character, a group of characters, a logo, a picture, a design, a sequence of sound, a sequence of film or a three-dimensional pattern.

In another embodiment according to the invention, the normalized matrix represents a normalized image with each element of the normalized matrix corresponding to a location on the normalized image. The normalized image includes the pattern to identify and the normalized matrix is the mathematical object that represents the normalized image. The normalized matrix can be processed by mathematical methods in order to extract the features of the normalized image that make possible the identification of the pattern.

In an embodiment according to the invention, the step of normalizing the input image to a normalized matrix includes scaling, thresholding, smoothing, interpolation, and filtering and the normalized image that corresponds to the normalized matrix has a predetermined format. The step of normalizing the input image to a normalized matrix converts the input image with the pattern to identify to a workable format. This workable format is a matrix with specific characteristics.

These specific characteristics may be that the normalized matrix is binary, that in the normalized image, the standard deviation of the distance from the centre of the value representing the pixels of a given colour is constant.

In embodiments according to the invention, the elements of the image vector are equal to the elements of the normalized matrix. In the step of transforming the normalized matrix to an image vector, the elements of the image vector are typically equal to the elements of the normalized matrix. Since in an embodiment of the present invention, the elements of the normalized matrix are binary numbers, the elements of the image vector may be binary numbers.

In embodiments according to the invention, information about elements of the normalized matrix is redundant in the feature vector. This redundancy improves the accuracy of the pattern identification and may be achieved by the choice of parameters, and especially the fact that, in an embodiment of the present invention, the shorter wavelength is shorter than the distance between two adjacent centres and the longer wavelength is longer than the distance between two adjacent centres.

In an embodiment according to the invention, the feature vector is approximated. This might increase the speed of the computation of the pattern identification method. The important point is the accuracy of the identification of the pattern, the accuracy of the feature vector is of less importance.

In an embodiment according to the invention, the normalized matrix is a 64×64 matrix, the image vector has 4096 elements, the sparse matrix is a 300×4096 matrix, the covariance matrix is a 300×300 matrix, the average vector has 300 elements, the feature vector has 300 elements, the angle related to the direction of the sinusoidal wave takes the values 0, 0.523598, 1.0472, 1.5708, 2.09439 and 2.61799 radians, the centres of the Gabor function are located at positions (6,6), (6,18), (6,30), (6,42), (6,54), (18,6), (18,18), (18,30), (18,42), (18,54), (30,6), (30,18), (30,30), (30,42), (30,54), (42,6), (42,18), (42,30), (42,42), (42,54), (54,6), (54,18), (54, 30), (54,42), (54,54), the first wavelength value is equal to 11, the second wavelength value is equal to 22 and the standard deviation of the Gaussian function is equal to 8. This embodiment has been found to give a very good accuracy and corresponding calculations are fast.

In another embodiment of the present invention, a computer program product comprises a computer usable medium having control logic stored therein for causing a computing device to identify a pattern in an input image. The control logic comprises:
  a) first computer readable program code means for normalizing the input image to a normalized matrix representing a normalized image,
  b) second computer readable program code means for generating an image vector from the normalized matrix,
  c) third computer readable program code means for multiplying the image vector with a sparse matrix using a matrix vector multiplication to generate a feature vector wherein the sparse matrix is generated from a Gabor function which is a sinusoidal wave multiplied by a Gaussian function and wherein the Gabor function is a function of at least one variable indicating a position in the normalized matrix and of a set of parameters including a parameter related to the direction of the sinusoidal wave, a parameter related to a centre of the Gabor function, and a parameter related to a wavelength of the sinusoidal wave,
  d) fourth computer readable program code means for creating with the feature vector a density of probability for a predetermined list of models, e) fifth computer readable program code means for selecting the model with the highest density of probability as the best model, and f) sixth computer readable program code means for classifying the best model as the pattern of the input image, wherein there are at least two centres of the Gabor function, and wherein the wavelength takes at least two values, with a first wavelength value lower than or substantially equal to the distance between two adjacent centres of the Gabor function, and the first wavelength value is lower than a second wavelength value and higher than or substantially equal to half the second wavelength value.

In an embodiment of the present invention, the method for identifying a pattern in an input image comprises the steps of a) normalizing the input image to a normalized matrix representing a normalized image, b) creating a feature vector from the normalized matrix with a Gabor function, wherein the Gabor function is a sinusoidal wave multiplied by a Gaussian function and depends on at least one variable related to a position on the normalized image and on a set of parameters including a parameter related to the direction of the sinusoidal wave, at least one parameter related to a centre of the Gabor function, and a parameter related to a wavelength of the sinusoidal wave, c) generating from the feature vector and a predetermined list of models 108 a density of probability of each model, d) identifying the model with the highest density of probability as the pattern in an input image, wherein there are at least two centres of the Gabor function, and the wavelength takes values in a first set of at least one value and in a second set of at least one value with a. the first set of at least one value lower than or substantially equal to the distance between two adjacent centres of the Gabor function, and b. the first set of at least one value higher than or substantially equal to half the values in the second set of at least one value.

It has been found that by a combination of these steps, a fast and accurate pattern recognition method may be achieved. In particular, firstly, the feature vector generated in step c) is large enough to make the recognition accurate and is small enough to make the computation of the pattern recognition method fast. Further, choosing two wavelengths, the shorter higher than or equal to half the longer and lower than or equal to the distance between two Gabor function centres, is a good trade-off to keep low the number of wavelengths (and thus the size of the feature vector) and still make the feature vector slightly redundant.

In an embodiment of the invention, the models are characterized by a covariance matrix and an average vector. The density of probability may be calculated by the formula $$p(r) = \frac{1}{\sqrt{(2\pi)^k |\Sigma|}} \exp\left[-\frac{(r-\mu)^t \sum (r-\mu)}{2}\right]$$

where the symbol r represents the feature vector, the symbol $\Sigma$ represents the covariance matrix, the symbol $\mu$ represents the average vector and k is equal to the number of elements of the feature vector. In embodiments of the invention, all the non-diagonal elements of the covariance matrix may be set to zero, the covariance matrix may be approximated, the traces of the covariance matrices of all models may be equal. It has been found that the characterization of the models by such covariance matrix and average vector and the calculation of the density of probability by this formula, in combination with the method described above, makes the recognition especially fast and accurate.

In embodiments according to the invention, the parameter related to the direction of the sinusoidal wave is such that the angles between the possible directions of the sinusoidal wave are substantially equal.

In an embodiment according to the invention, the parameter related to the direction of the sinusoidal wave is an angle and the sum of its highest value and its lowest value is equal to $\pi$ radians. This angle may take six values. This choice of values for the parameter related to the direction of the sinusoidal wave gives a good trade-off to achieve a sufficient angular sampling of the normalized image and keep the size of the feature vector small enough to get fast computation of the method.

In embodiments according to the invention, at least two parameters relate to a centre of the Gabor function and may be such that that the centres of the Gabor function are regularly spaced. One parameters related to a centre of the Gabor function may correspond to a vertical direction in the normalized matrix and one parameters related to a centre of the Gabor function may correspond to an horizontal direction in the normalized matrix. The distance of a first centre of the Gabor function to an edge of the normalized matrix may be substantially equal to half the distance between two adjacent centres of the Gabor function. This choice of the centres of the Gabor function gives a good sampling of the normalized image and keep the size of the feature vector small enough to get fast computation of the method.

In embodiments according to the invention, a parameter relates to the width of the Gaussian function, which may be the standard deviation of the Gaussian function. This standard deviation of the Gaussian function may be lower than the distance between two adjacent centres of the Gabor function and may be higher than the half distance between two adjacent centres of the Gabor function. This choice of the width of the Gaussian gives a good sampling of the normalized image, makes the feature vector slightly redundant and keep the size of the feature vector small enough to get fast computation of the method.

In embodiments according to the invention, pattern is a two-colour pattern, a character, an Asian character, a group of characters, a logo, a picture, a design, a sequence of sound, a sequence of film or a three-dimensional pattern.

In embodiments according to the invention, the normalized matrix represents a normalized image with each element of the normalized matrix corresponding to a location on the normalized image. The normalized image includes the pattern to identify and the normalized matrix is the mathematical object that represents the normalized image. The normalized matrix can be processed by mathematical methods in order to extract the features of the normalized image that make possible the identification of the pattern.

In embodiments according to the invention, the step of normalizing the input image to a normalized matrix includes scaling, thresholding, smoothing, interpolation, and filtering and the normalized image that corresponds to the normalized matrix has a predetermined format. The step of normalizing the input image to a normalized matrix converts the input image with the pattern to identify to a workable format. This workable format is a matrix with specific characteristics. These specific characteristics may be that the normalized matrix is binary, that in the normalized image, the standard deviation of the distance from the centre of the value representing the pixels of a given colour is constant.

In embodiments according to the invention, the elements of an image vector are equal to the elements of the normalized matrix. In the step of transforming the normalized matrix to an image vector, the elements of the image vector are typically set equal to the elements of the normalized matrix. Since in an embodiment of the present invention, the elements of the normalized matrix are binary numbers, the elements of the image vector may be binary numbers.

In embodiments according to the invention, information about elements of the normalized matrix is redundant in the feature vector. This redundancy improves the accuracy of the pattern identification and may be achieved by the choice of parameters, and especially the fact that, in an embodiment of the present invention, the standard deviation of the Gaussian function of the Gabor function is lower than the distance between two adjacent centres but higher than half the distance between two adjacent centres.

In embodiments according to the invention, the feature vector is approximated. This might increase the speed of the computation of the pattern identification method. The important point is the accuracy of the identification of the pattern, the accuracy of the feature vector itself is of less importance.

In an embodiment according to the invention, the normalized matrix is a 64×64 matrix, the image vector has 4096 elements, a sparse matrix used in the step of creation of the feature vector is a 300×4096 matrix, the covariance matrix is a 300×300 matrix, the average vector has 300 elements, the feature vector has 300 elements, the angle related to the direction of the sinusoidal wave takes the values 0, 0.523598, 1.0472, 1.5708, 2.09439 and 2.61799 radians, the centres of the Gabor function are located at positions (6,6), (6,18), (6,30), (6,42), (6,54), (18,6), (18,18), (18,30), (18,42), (18,54), (30,6), (30,18), (30,30), (30,42), (30,54), (42,6), (42,18), (42,30), (42,42), (42,54), (54,6), (54,18), (54,30), (54,42), (54,54), the first wavelength value is equal to 11, the second wavelength value is equal to 22 and the standard deviation of the Gaussian function is equal to 8. This embodiment has been found to give a very good accuracy and corresponding calculations are fast.

In another embodiment of the present invention, the computer program product comprises a computer usable medium having control logic stored therein for causing a computing device to identify a pattern in an input image. The control logic comprises:
  a) first computer readable program code means for normalizing the input image to a normalized matrix representing a normalized image,
  b) second computer readable program code means for creating a feature vector from the normalized matrix with a Gabor function, wherein the Gabor function is a sinusoidal wave multiplied by a Gaussian function and depends on at least one variable related to a position on the normalized image and on a set of parameters including a parameter related to the direction of the sinusoidal wave, at least one parameter related to a centre of the Gabor function, and a parameter related to a wavelength of the sinusoidal wave,
  c) third computer readable program code means for generating from the feature vector and a predetermined list of models a density of probability of each model to identify a best model as the pattern in an input image,
  d) fourth computer readable program code means for identifying the model with the highest density of probability as the pattern in an input image wherein there are at least two centres of the Gabor function, and the wavelength takes values in a first set of at least one value and in a second set of at least one value with
  a. the first set of at least one value lower than or substantially equal to the distance between two adjacent centres of the Gabor function, and
  b. the first set of at least one value higher than or substantially equal to half the values in the second set of at least one value.

BRIEF DESCRIPTION OF THE DRAWINGS

For a better understanding of the present invention, reference will now be made, by way of example, to the accompanying drawings in which:

FIG. 5 a shows an illustration of matrix multiplication between a sparse matrix and an image vector used in an optical character recognition process according to the invention.

FIG. 5 b shows an illustration of a threshold matrix used in an optical character recognition process according to the invention.

DESCRIPTION OF THE INVENTION

The present invention will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Furthermore, the various embodiments, although referred to as "preferred" are to be construed as exemplary manners in which the invention may be implemented rather than as limiting the scope of the invention.

The term "comprising", used in the claims, should not be interpreted as being restricted to the elements or steps listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B, rather with respect to the present invention, the only enumerated components of the device are A and B, and further the claim should be interpreted as including equivalents of those components.

Binary numbers, vectors and matrices are assumed here to be written with 0 and 1 but it is clear for somebody skilled in the art that it could be written as true and false, black and white or any other means to state a binary state.

In an embodiment of the present invention, binary images are processed. Binary images are digital images with only two possible colours for each pixel. These two colours, usually black and white, can be represented as true and false values or 1 and 0 values. A representation with 1 and 0 is especially useful to perform mathematical image processing. The processing of binary images often involves filtering steps in order for example to enhance some characteristics of the image, or to perform some morphological operations on the image. Filters are usually mathematically described by matrices and the application of a filter on a binary image is described by the matrix multiplication of the filter matrix and the binary image matrix. This kind of operation can for example be used in Optical Character Recognition, as a step in the image treatment to extract the image features in view of recognizing an optical character.

Optical Character Recognition systems convert the image of text into machine-readable code by using a character recognition process. In an OCR system, the images of what could be characters are isolated and a character recognition process is used to identify the character.

An embodiment of the present invention relates to optical character recognition starting from an input image representing a character or another pattern. In a preferred embodiment of the present invention the optical character recognition starts from an input image representing an Asian character. The input image is, in an embodiment of the invention, a two colours image. In a preferred embodiment of the present invention, the input image is a black and white image. In an embodiment of the present invention, the input image is a two-dimensional image. In an embodiment of the present invention, the input image represents a pattern including a character, a logo, a picture or a design, to be recognized by the recognition system. In a further embodiment of the present invention, the pattern is a sequence of sound, a sequence of film or a three-dimensional pattern, to be recognized by the recognition system.

Figure 1:
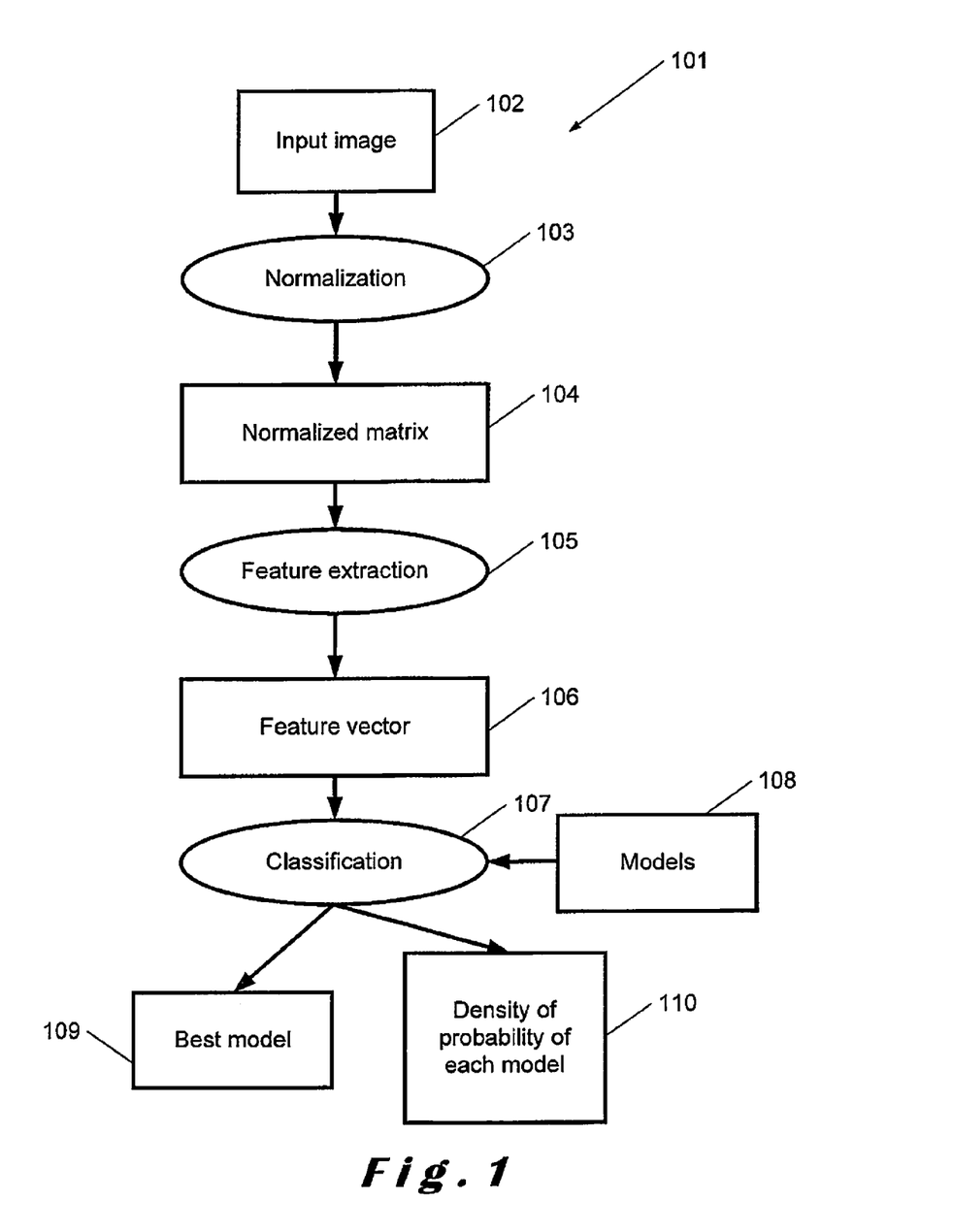
FIG. 1 shows a flowchart of an optical character recognition process according to the invention.

An optical character recognition process 101 according to an embodiment of the invention shown in FIG. 1, comprises:
a step of normalization 103 that generates a normalized matrix 104 from an input image 102;
a step of feature extraction 105 that generates a feature vector 106 from the normalized matrix 104; and
a step of classification 107 that calculates a best model 109 for the input image 102 amongst a series of possible models 108. The step of classification 107 also returns a density of probability 110 of each model, which provides a measure of the accuracy of the classification step 107.

Figure 2:
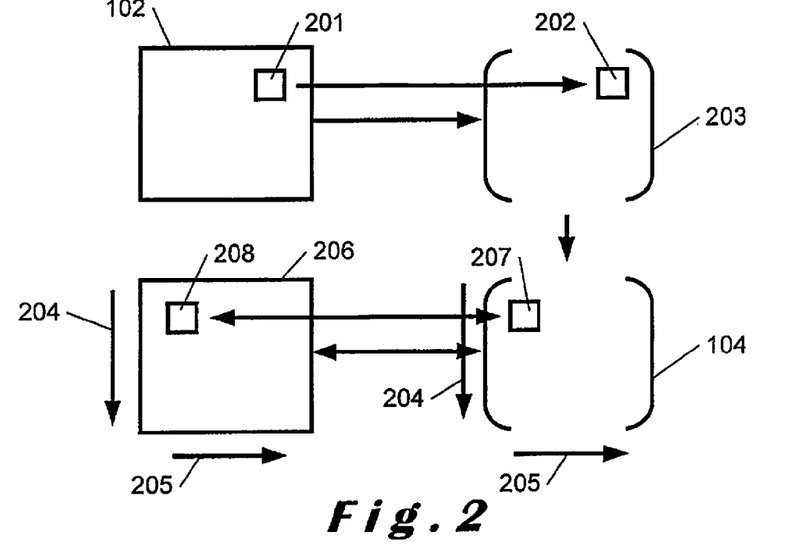
FIG. 2 shows is a schematic illustration of a normalization step in an optical character recognition process according to the invention.

In the normalization step 103, the input image 102 is subdivided into pixels 201. Each pixel 201 of the input image 102 is represented by an element 202 of an intermediate matrix 203, as illustrated in FIG. 2. The intermediate matrix 203 is, in an embodiment of the invention, a binary matrix. The intermediate matrix 203 undergoes a combination of steps that may include scaling, thresholding, smoothing, interpolation, filtering, . . . . The output of this combination of steps is a normalized matrix 104 that corresponds to a normalized image 206. In an embodiment of the present invention, the normalized image 206 has a predetermined format and is centered.

Every element 207 of the normalized matrix 104 corresponds to a pixel 208 of the predetermined format in the normalized image 206.

In an embodiment of the present invention, the normalized matrix 104 is a binary matrix, which corresponds to a two-colours normalized image 206. Every element of the normalized matrix 104 is characterized by its row x 204 and its column y 205, which corresponds to a location on the normalized image 206. In an embodiment of the present invention, the normalized matrix 104 is a 64×64 matrix. In an embodiment of the present invention, in the normalized image 206, the standard deviation of the distance from the centre of the value representing the pixels of a given colour is constant. In a preferred embodiment of the present invention, in the normalized image 206, the standard deviation of the distance from the centre of the value representing the pixels of a given colour is equal to 16 pixels. In an embodiment of the present invention, the height width aspect ratio of the pattern or character is preserved during the normalization step 103.

The feature extraction step 105 that generates the feature vector 106 from the normalized matrix 104 involves a matrix vector multiplication 304. This can be explained in details with the help of FIG. 3. The normalized matrix 104 of dimensions A×B is transformed into an image vector 301 of length A*B. During this transformation, each element of the image vector 301 is set equal to an element of the normalized matrix 104 in such a way that all elements of the normalized matrix 104 are copied only once in the image vector 301. In an embodiment of the present invention, the image vector 301 is a binary vector. The image vector 301 contains the normalized image 206 information. The location of an element of row x 204 and column y 205 in the normalized matrix 104, i.e., that corresponds to a location in the normalized image 206, corresponds also to a specific value of the index j 302 that indicates the $j^{th}$ element of the image vector 301. In an embodiment of the present invention, the image vector 301 has 4096 elements and the index j can take all integer values between 1 and 4096. This corresponds to a 64×64 normalized matrix 104 (64*64=4096).

Figure 3:
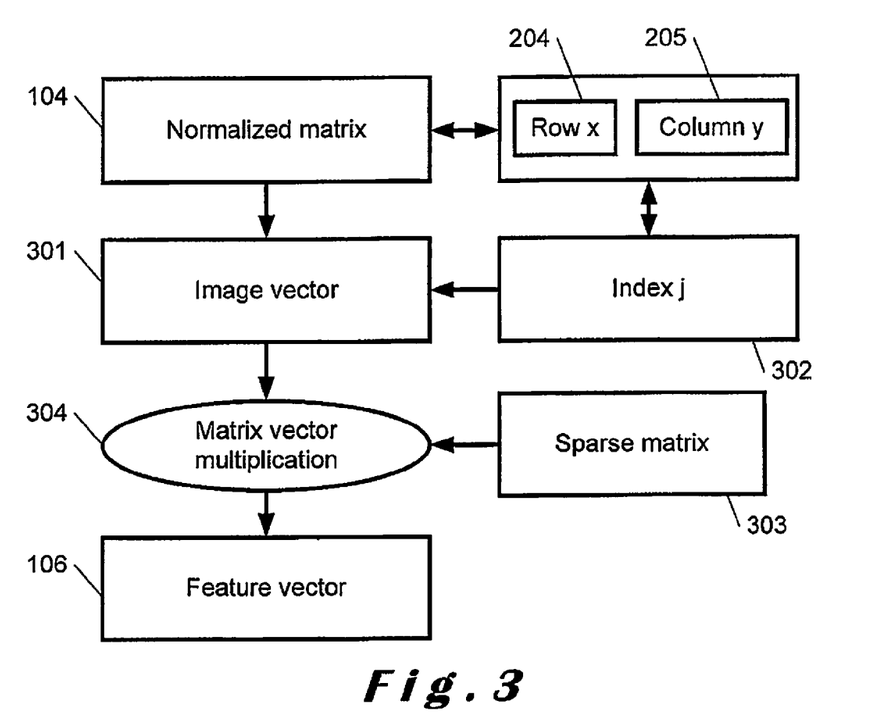
FIG. 3 shows a flowchart of a feature extraction step in an optical character recognition process according to the invention.

In an embodiment of the present invention, the matrix vector multiplication 304 is approximate and the feature vector 106 is an approximation of the exact mathematical result of the matrix multiplication between a sparse matrix 303 and the image vector 301. An index i 401 is used to specify the $i^{th}$ element of the feature vector 106. The adjective "sparse" indicates that the matrix is populated primarily with zeros in an embodiment of the present invention.

Figure 4:
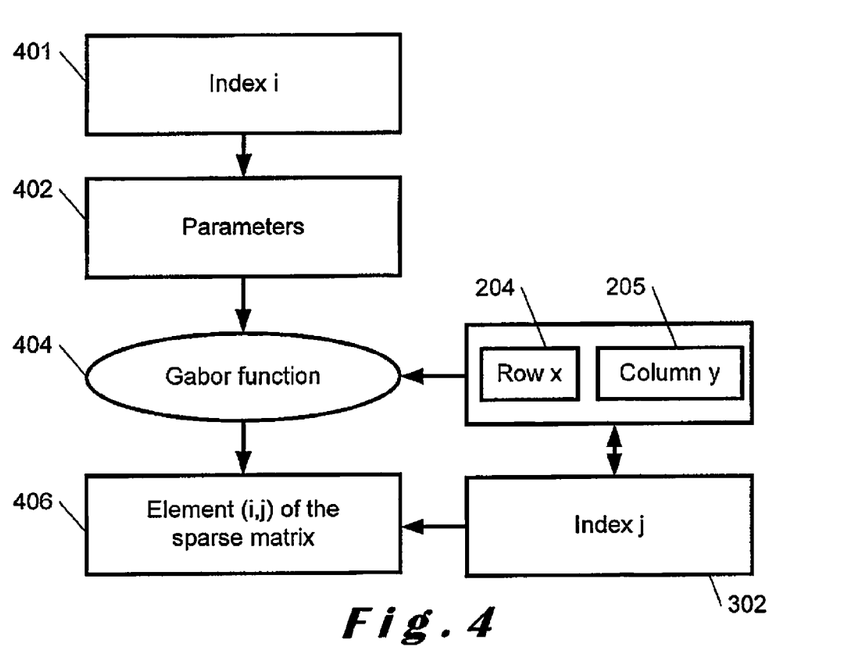
FIG. 4 shows a flowchart that describes how the sparse matrix elements are generated in an optical character recognition process according to the invention.

FIG. 4 describes the generation, with a Gabor function 404, of an element 406 located at row i 401 and column j 302 of the sparse matrix 303. All elements 406 of the sparse matrix 303 are generated in the same way. The Gabor function 404 is a plane sinusoidal wave multiplied by a Gaussian function. The Gabor function 404 has parameters 402, which correspond to the index i, and variables x 204 and y 205, which correspond to the index j, as inputs.

The row index i 401 of the sparse matrix element 406 to calculate, specifies the values taken by the parameters 402 used in the Gabor function 404. In an embodiment of the present invention, the parameters 402 are represented by the symbols $\alpha_i$, $\sigma_i$, $\lambda_i$, $Cx_i$ and $Cy_i$:

$\alpha_i$ is an angle related to the direction of the plane sinusoidal wave of the Gabor function 404;

$\sigma_i$ is the standard deviation of the Gaussian function of the Gabor function 404;

$\lambda_i$ is the wavelength of the plane sinusoidal wave of the Gabor function 404;

$Cx_i$ is the centre of the Gabor function 404 on the normalized image 206, in the vertical direction; and $Cy_i$ is the centre of the Gabor function 404 on the normalized image 206, in the horizontal direction.

In an embodiment of the invention, the parameters are chosen as follows:

The $Cx_i$ values are regularly spaced.

If the distance between two $Cx_i$ values is called dCx, the first $Cx_i$, $Cx_1$ is equal to dCx/2.

The $Cy_i$ values are regularly spaced.

If the distance between two $Cy_i$ values is called dCy, the first $Cy_i$, $Cy_1$ is equal to dCy/2.

The angles $\alpha_i$ are regularly spaced.

The sum of the highest value of $\alpha_i$ and the lowest value of $\alpha_i$ is equal to $\pi$ radians.

The values of $\sigma_i$ are lower than dCx.

The values of $\sigma_i$ are higher than dCx/2.

The values of $\sigma_i$ are lower than dCy.

The values of $\sigma_i$ are higher than dCy/2.

In a first set of values of at least one value, the values of $\lambda_i$ are lower than dCx and than dCy.

The values of $\lambda_i$ in a second set of values of at least one value are such that the values in the first set of values are higher than or substantially equal to half the values in the second set of values.

In further embodiments of the invention, the parameters fulfil one or several of the following conditions:

dCx and dCy are equal to each other.

$Cx_i$ takes five values.

$Cy_i$ takes five values.

$\alpha_i$ takes six values.

$\alpha_i$ takes the values 0, 0.523598, 1.0472, 1.5708, 2.09439 and 2.61799 radians.

$\sigma_i$ takes one value.

$\lambda_i$ takes two values: $\lambda_1$ and $\lambda_2$.

$\lambda_1$ is lower than dCx.

$\lambda_1$ is lower than dCy.

$\lambda_2$ is higher than $\lambda_1$ and lower than or equal to $2*\lambda_1$.

In a preferred embodiment of a 64×64 normalized matrix 104, the positions $Cx_i$ are 6, 18, 30, 42 and 54, the positions $Cy_i$ are 6, 18, 30, 42 and 54, the standard deviation $\sigma_i$ is 8, the wavelengths $\lambda_i$ are 11 and 22. The values of the parameters in an embodiment of the present invention are given in Table 1.

The number of sets of values for the parameters 402 is equal to (number of values of $Cx_i$*number of values of $Cy_i$*number of values of $\alpha_i$*number of values of $\sigma_i$*number of values of $\lambda_i$). In a preferred embodiment, the number of parameter sets is equal to 300=5*5*6*1*2 and the row index i 401 takes integer values from 1 to 300.

The column index j 302 of the sparse matrix element 406 to calculate, specifies the values of the variables x 204 and y 205 used by the Gabor function 404.

The Gabor function 404 is expressed by:

$$g[i,(x,y)] = \frac{1}{2\pi\sigma_i^2}\exp\left\{\sqrt{-1}\frac{2\pi}{\lambda_i}[\cos(\alpha_i)(x-Cx_i)+\sin(\alpha_i)(y-Cy_i)] - \frac{(x-Cx_i)^2+(y-Cy_i)^2}{2\sigma_i^2}\right\}$$

The output of the Gabor function 404 calculated from a given set of values of the parameters 402 that corresponds to the index i 401, at a given position of row x 204 and column y 205 of the normalized image 206 that corresponds to the index j 302 is the element 406 of row i 401 and column j 302 in the sparse matrix 303. The number of columns of the sparse matrix 303 is equal to the number of elements of the image vector 301. In an embodiment of the present invention, the sparse matrix 303 is a 300×4096 matrix.

In an embodiment of the present invention, the element (i,j) 406 of the sparse matrix is given by $$Mij = \frac{1}{2\pi\sigma_i^2}\exp$$

$$\left\{\frac{\sqrt{-1}\,2\pi}{\lambda_i}[\cos(\alpha_i)((j-1)\%64 - Cx_i) + \sin(\alpha_i)((j-1)//64 - Cy_i)] - \frac{((j-1)\%64 - Cx_i)^2 + ((j-1)//64 - Cy_i)^2}{2\sigma_i^2}\right\}$$

The symbol % represents the modulo operation and takes precedence over the * and / operations, and the symbol // gives the entire part of the result of a division between integers and takes precedence over the * and / operations. The parameters take the following values $$\alpha_i = (i-1)\%\, nb_\alpha * \frac{\pi}{nb_\alpha}$$

$$\varphi_i = \frac{2^{\left(\frac{i-1}{nb_\alpha}\right)\%\, nb_\lambda}}{maxWavelength}$$

$$Cy_i = stepSize//2 + stepSize*\left(\frac{i-1}{nb_\alpha * nb_\lambda}\right)\%\, nbSteps$$

$$Cx_i = stepSize//2 + stepSize*\left(\frac{i-1}{nb_\alpha * nb_\lambda * nbSteps}\right)\%\, nbFeatures$$

$nb_\alpha$=6
$nb_\lambda$=2
maxWavelength=22
stepSize=12
nbSteps=5
nbFeatures=300
$\sigma$=8.

nbSteps is such that $Cx_i$ and $Cy_i$ are lower than or equal to 64.

Figure 5A:
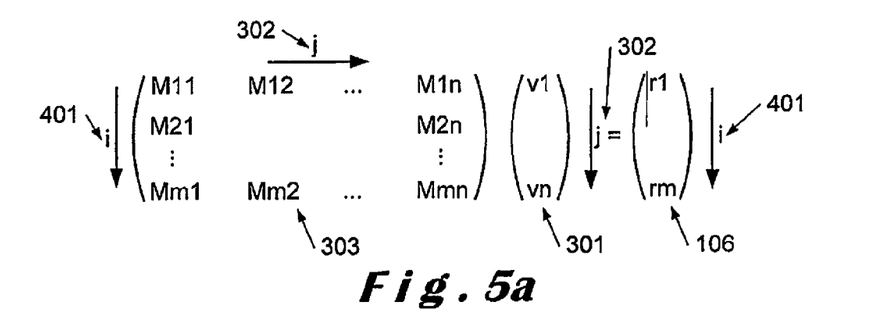

A matrix vector multiplication 304 is performed to multiply the sparse matrix 303 and the image vector 301, the sparse matrix 303 being the first factor of the multiplication and the image vector 301 being the second factor of the multiplication as illustrated in FIG. 5. The vector resulting of the multiplication of the sparse matrix 303 and the image vector 301 is the feature vector 106. The number of elements of the feature vector 106 is equal to the number of rows of the sparse matrix 303. In a preferred embodiment of the present invention, the number of elements of the feature vector 106 is equal to 300.

In an embodiment of the present invention, the feature vector 106 contains specific information about the input image 102, this specific information being related to the image features important in view of pattern recognition. The choice of parameters, and especially the fact that, in an embodiment of the present invention, the standard deviation of the Gaussian function of the Gabor function is lower than the distance between two adjacent centres but higher than half the distance between two adjacent centres makes the information contained in the feature vector 106 slightly redundant.

This redundancy of information in the feature vector 106 increases the accuracy of the classification step 107.

The matrix multiplication between the sparse matrix 303 and the image vector 301 resulting in the feature vector 106 is shown on FIG. 5a. The elements of the sparse matrix 303 are called Mij. i is the index that gives the row number and takes all integer values between 1 and m. j is the index that gives the column number and takes all integer values between 1 and n. The image vector 301 has one column of n elements called vj. The feature vector 106 has one column of m elements called ri. The matrix multiplication is such that the feature vector 106 elements ri are calculated as $$ri = \Sigma_{j=1}^{n} Mij\, vj \quad \text{(Equation 1)}$$

Figure 5B:
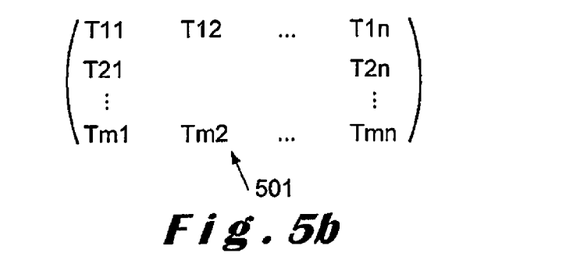

Some terms may be neglected in the sum of Equation 1. For example, the terms Mij vj where vj is equal to zero are also equal to 0. Further, in the case where vj is equal to 1, and where the sparse matrix 303 element Mij is small, the term Mij vj may also be neglected. To control "small", a threshold matrix 501 with elements Tij, shown on FIG. 5b, is used in an embodiment of the present invention. In an embodiment of the present invention, a term Mij vj can be neglected if Mij is lower than Tij. In a further embodiment of the present invention, all the elements Tij of the threshold matrix 501 have the same value. Since the Gabor function 404 is a plane sinusoidal wave multiplied by a Gaussian function, many of the elements of the sparse matrix 303 are very small.

Figure 6:
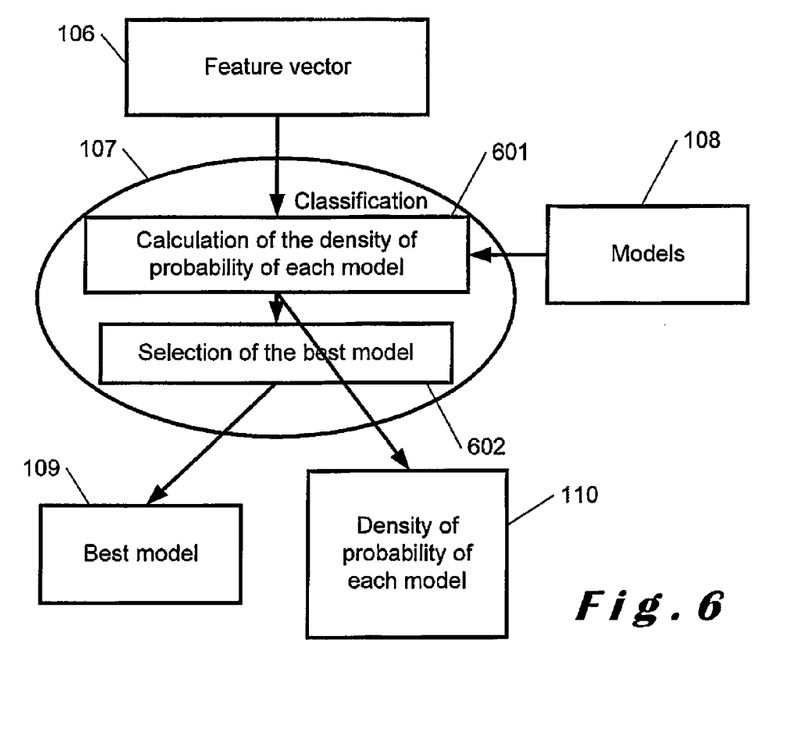
FIG. 6 shows a flowchart of a classification step in an optical character recognition process according to the invention.

The classification step 107 of the OCR process 101 can be described with the help of FIG. 6. In an embodiment of the present invention, the classification step 107 is a variation of the nearest neighbour classifier method that uses weighted Euclidian distance where weights are different for each class. The classification step 107 uses the feature vector 106 and models 108 as inputs. In an embodiment of the present invention, the models 108 correspond to characters, groups of characters or characters in a given font family. In an embodiment of the present invention, the models 108 correspond to Asian characters, groups of Asian characters or Asian characters in a given font family. In an embodiment of the present invention, the models 108 correspond sequences of sound, sequences of film or a three-dimensional patterns.

In an embodiment of the present invention, a model 108 is defined by a covariance matrix $\Sigma$ and an average vector $\mu$. In an embodiment of the present invention, all the non-diagonal elements of $\Sigma$ are set to zero. In an embodiment of the present invention, the covariance matrices $\Sigma$ are multiplied by a constant (different constant for each model) in such a way that the traces of the covariance matrices $\Sigma$ of all the models are equal. In an embodiment of the present invention, the covariance matrix is approximated. In an embodiment of the present invention, $\Sigma$ is a 300×300 matrix and $\mu$ a vector of 300 elements.

To select the model that corresponds best to the input image 102 corresponding to the feature vector 106, for each model 108, a density of probability 110 is calculated as $$p(r) = \frac{1}{\sqrt{(2\pi)^k |\Sigma|}} \exp\left[-\frac{(r-\mu)^t \Sigma (r-\mu)}{2}\right],$$

where the symbol r represents the feature vector 106.

The symbol $|\Sigma|$ represents the determinant of the matrix $\Sigma$ and the t in $(r-\mu)^t$ indicates the transposition of the vector $(r-\mu)$. k is equal to the number of elements of the feature vector 106. In an embodiment of the present invention, k is equal to 300. The product $(r-\mu)^t \Sigma (r-\mu)$ is a matrix multiplication following the usual mathematical conventions.

Once the density of probability 601 of each model 108 is calculated in a calculation step 601, the best model 109 is selected in a selection step 602. The best model 109 is the model with the highest density of probability 110. In an embodiment of the present invention, the classification step 107 returns the best model 109 and the density of probability 110 of each model, to provide a measure of the accuracy of the classification step. In an alternative embodiment, the classification step 107 returns only the best model 109. In an alternative embodiment, the classification step 107 returns only the density of probability of each model 110.

An embodiment of the present invention includes the combination of

- the feature extraction step 105 with the parameters 402 as described above, and
- the classification step 107 based on weighted Euclidian distances with all the non-diagonal elements of the covariance matrix $\Sigma$ set to zero and the traces of the covariance matrices $\Sigma$ of all the models equal.

Such an OCR system enables image reconstruction, can be computed efficiently and makes the OCR accuracy extremely high.

TABLE 1

| index | $\sigma_i$ | $1/\lambda_i$ | $\alpha_i$ | $Cx_i$ | $Cy_i$ |
|---|---|---|---|---|---|
| 1 | 8 | 0.0454545 | 0 | 6 | 6 |
| 2 | 8 | 0.0454545 | 0.523598 | 6 | 6 |
| 3 | 8 | 0.0454545 | 1.0472 | 6 | 6 |
| 4 | 8 | 0.0454545 | 1.5708 | 6 | 6 |
| 5 | 8 | 0.0454545 | 2.09439 | 6 | 6 |
| 6 | 8 | 0.0454545 | 2.61799 | 6 | 6 |
| 7 | 8 | 0.0909091 | 0 | 6 | 6 |
| 8 | 8 | 0.0909091 | 0.523598 | 6 | 6 |
| 9 | 8 | 0.0909091 | 1.0472 | 6 | 6 |
| 10 | 8 | 0.0909091 | 1.5708 | 6 | 6 |
| 11 | 8 | 0.0909091 | 2.09439 | 6 | 6 |
| 12 | 8 | 0.0909091 | 2.61799 | 6 | 6 |
| 13 | 8 | 0.0454545 | 0 | 6 | 18 |
| 14 | 8 | 0.0454545 | 0.523598 | 6 | 18 |
| 15 | 8 | 0.0454545 | 1.0472 | 6 | 18 |
| 16 | 8 | 0.0454545 | 1.5708 | 6 | 18 |
| 17 | 8 | 0.0454545 | 2.09439 | 6 | 18 |
| 18 | 8 | 0.0454545 | 2.61799 | 6 | 18 |
| 19 | 8 | 0.0909091 | 0 | 6 | 18 |
| 20 | 8 | 0.0909091 | 0.523598 | 6 | 18 |
| 21 | 8 | 0.0909091 | 1.0472 | 6 | 18 |
| 22 | 8 | 0.0909091 | 1.5708 | 6 | 18 |
| 23 | 8 | 0.0909091 | 2.09439 | 6 | 18 |
| 24 | 8 | 0.0909091 | 2.61799 | 6 | 18 |
| 25 | 8 | 0.0454545 | 0 | 6 | 30 |
| 26 | 8 | 0.0454545 | 0.523598 | 6 | 30 |
| 27 | 8 | 0.0454545 | 1.0472 | 6 | 30 |
| 28 | 8 | 0.0454545 | 1.5708 | 6 | 30 |
| 29 | 8 | 0.0454545 | 2.09439 | 6 | 30 |
| 30 | 8 | 0.0454545 | 2.61799 | 6 | 30 |
| 31 | 8 | 0.0909091 | 0 | 6 | 30 |
| 32 | 8 | 0.0909091 | 0.523598 | 6 | 30 |
| 33 | 8 | 0.0909091 | 1.0472 | 6 | 30 |
| 34 | 8 | 0.0909091 | 1.5708 | 6 | 30 |
| 35 | 8 | 0.0909091 | 2.09439 | 6 | 30 |
| 36 | 8 | 0.0909091 | 2.61799 | 6 | 30 |
| 37 | 8 | 0.0454545 | 0 | 6 | 42 |
| 38 | 8 | 0.0454545 | 0.523598 | 6 | 42 |
| 39 | 8 | 0.0454545 | 1.0472 | 6 | 42 |
| 40 | 8 | 0.0454545 | 1.5708 | 6 | 42 |
| 41 | 8 | 0.0454545 | 2.09439 | 6 | 42 |
| 42 | 8 | 0.0454545 | 2.61799 | 6 | 42 |
| 43 | 8 | 0.0909091 | 0 | 6 | 42 |
| 44 | 8 | 0.0909091 | 0.523598 | 6 | 42 |
| 45 | 8 | 0.0909091 | 1.0472 | 6 | 42 |
| 46 | 8 | 0.0909091 | 1.5708 | 6 | 42 |
| 47 | 8 | 0.0909091 | 2.09439 | 6 | 42 |

TABLE 1-continued

| index | $\sigma_i$ | $1/\lambda_i$ | $\alpha_i$ | $Cx_i$ | $Cy_i$ |
|---|---|---|---|---|---|
| 48 | 8 | 0.0909091 | 2.61799 | 6 | 42 |
| 49 | 8 | 0.0454545 | 0 | 6 | 54 |
| 50 | 8 | 0.0454545 | 0.523598 | 6 | 54 |
| 51 | 8 | 0.0454545 | 1.0472 | 6 | 54 |
| 52 | 8 | 0.0454545 | 1.5708 | 6 | 54 |
| 53 | 8 | 0.0454545 | 2.09439 | 6 | 54 |
| 54 | 8 | 0.0454545 | 2.61799 | 6 | 54 |
| 55 | 8 | 0.0909091 | 0 | 6 | 54 |
| 56 | 8 | 0.0909091 | 0.523598 | 6 | 54 |
| 57 | 8 | 0.0909091 | 1.0472 | 6 | 54 |
| 58 | 8 | 0.0909091 | 1.5708 | 6 | 54 |
| 59 | 8 | 0.0909091 | 2.09439 | 6 | 54 |
| 60 | 8 | 0.0909091 | 2.61799 | 6 | 54 |
| 61 | 8 | 0.0454545 | 0 | 18 | 6 |
| 62 | 8 | 0.0454545 | 0.523598 | 18 | 6 |
| 63 | 8 | 0.0454545 | 1.0472 | 18 | 6 |
| 64 | 8 | 0.0454545 | 1.5708 | 18 | 6 |
| 65 | 8 | 0.0454545 | 2.09439 | 18 | 6 |
| 66 | 8 | 0.0454545 | 2.61799 | 18 | 6 |
| 67 | 8 | 0.0909091 | 0 | 18 | 6 |
| 68 | 8 | 0.0909091 | 0.523598 | 18 | 6 |
| 69 | 8 | 0.0909091 | 1.0472 | 18 | 6 |
| 70 | 8 | 0.0909091 | 1.5708 | 18 | 6 |
| 71 | 8 | 0.0909091 | 2.09439 | 18 | 6 |
| 72 | 8 | 0.0909091 | 2.61799 | 18 | 6 |
| 73 | 8 | 0.0454545 | 0 | 18 | 18 |
| 74 | 8 | 0.0454545 | 0.523598 | 18 | 18 |
| 75 | 8 | 0.0454545 | 1.0472 | 18 | 18 |
| 76 | 8 | 0.0454545 | 1.5708 | 18 | 18 |
| 77 | 8 | 0.0454545 | 2.09439 | 18 | 18 |
| 78 | 8 | 0.0454545 | 2.61799 | 18 | 18 |
| 79 | 8 | 0.0909091 | 0 | 18 | 18 |
| 80 | 8 | 0.0909091 | 0.523598 | 18 | 18 |
| 81 | 8 | 0.0909091 | 1.0472 | 18 | 18 |
| 82 | 8 | 0.0909091 | 1.5708 | 18 | 18 |
| 83 | 8 | 0.0909091 | 2.09439 | 18 | 18 |
| 84 | 8 | 0.0909091 | 2.61799 | 18 | 18 |
| 85 | 8 | 0.0454545 | 0 | 18 | 30 |
| 86 | 8 | 0.0454545 | 0.523598 | 18 | 30 |
| 87 | 8 | 0.0454545 | 1.0472 | 18 | 30 |
| 88 | 8 | 0.0454545 | 1.5708 | 18 | 30 |
| 89 | 8 | 0.0454545 | 2.09439 | 18 | 30 |
| 90 | 8 | 0.0454545 | 2.61799 | 18 | 30 |
| 91 | 8 | 0.0909091 | 0 | 18 | 30 |
| 92 | 8 | 0.0909091 | 0.523598 | 18 | 30 |
| 93 | 8 | 0.0909091 | 1.0472 | 18 | 30 |
| 94 | 8 | 0.0909091 | 1.5708 | 18 | 30 |
| 95 | 8 | 0.0909091 | 2.09439 | 18 | 30 |
| 96 | 8 | 0.0909091 | 2.61799 | 18 | 30 |
| 97 | 8 | 0.0454545 | 0 | 18 | 42 |
| 98 | 8 | 0.0454545 | 0.523598 | 18 | 42 |
| 99 | 8 | 0.0454545 | 1.0472 | 18 | 42 |
| 100 | 8 | 0.0454545 | 1.5708 | 18 | 42 |
| 101 | 8 | 0.0454545 | 2.09439 | 18 | 42 |
| 102 | 8 | 0.0454545 | 2.61799 | 18 | 42 |
| 103 | 8 | 0.0909091 | 0 | 18 | 42 |
| 104 | 8 | 0.0909091 | 0.523598 | 18 | 42 |
| 105 | 8 | 0.0909091 | 1.0472 | 18 | 42 |
| 106 | 8 | 0.0909091 | 1.5708 | 18 | 42 |
| 107 | 8 | 0.0909091 | 2.09439 | 18 | 42 |
| 108 | 8 | 0.0909091 | 2.61799 | 18 | 42 |
| 109 | 8 | 0.0454545 | 0 | 18 | 54 |
| 110 | 8 | 0.0454545 | 0.523598 | 18 | 54 |
| 111 | 8 | 0.0454545 | 1.0472 | 18 | 54 |
| 112 | 8 | 0.0454545 | 1.5708 | 18 | 54 |
| 113 | 8 | 0.0454545 | 2.09439 | 18 | 54 |
| 114 | 8 | 0.0454545 | 2.61799 | 18 | 54 |
| 115 | 8 | 0.0909091 | 0 | 18 | 54 |
| 116 | 8 | 0.0909091 | 0.523598 | 18 | 54 |
| 117 | 8 | 0.0909091 | 1.0472 | 18 | 54 |
| 118 | 8 | 0.0909091 | 1.5708 | 18 | 54 |
| 119 | 8 | 0.0909091 | 2.09439 | 18 | 54 |
| 120 | 8 | 0.0909091 | 2.61799 | 18 | 54 |
| 121 | 8 | 0.0454545 | 0 | 30 | 6 |
| 122 | 8 | 0.0454545 | 0.523598 | 30 | 6 |
| 123 | 8 | 0.0454545 | 1.0472 | 30 | 6 |
| 124 | 8 | 0.0454545 | 1.5708 | 30 | 6 |
| 125 | 8 | 0.0454545 | 2.09439 | 30 | 6 |
| 126 | 8 | 0.0454545 | 2.61799 | 30 | 6 |
| 127 | 8 | 0.0909091 | 0 | 30 | 6 |
| 128 | 8 | 0.0909091 | 0.523598 | 30 | 6 |
| 129 | 8 | 0.0909091 | 1.0472 | 30 | 6 |
| 130 | 8 | 0.0909091 | 1.5708 | 30 | 6 |
| 131 | 8 | 0.0909091 | 2.09439 | 30 | 6 |
| 132 | 8 | 0.0909091 | 2.61799 | 30 | 6 |
| 133 | 8 | 0.0454545 | 0 | 30 | 18 |
| 134 | 8 | 0.0454545 | 0.523598 | 30 | 18 |
| 135 | 8 | 0.0454545 | 1.0472 | 30 | 18 |
| 136 | 8 | 0.0454545 | 1.5708 | 30 | 18 |
| 137 | 8 | 0.0454545 | 2.09439 | 30 | 18 |
| 138 | 8 | 0.0454545 | 2.61799 | 30 | 18 |
| 139 | 8 | 0.0909091 | 0 | 30 | 18 |
| 140 | 8 | 0.0909091 | 0.523598 | 30 | 18 |
| 141 | 8 | 0.0909091 | 1.0472 | 30 | 18 |
| 142 | 8 | 0.0909091 | 1.5708 | 30 | 18 |
| 143 | 8 | 0.0909091 | 2.09439 | 30 | 18 |
| 144 | 8 | 0.0909091 | 2.61799 | 30 | 18 |
| 145 | 8 | 0.0454545 | 0 | 30 | 30 |
| 146 | 8 | 0.0454545 | 0.523598 | 30 | 30 |
| 147 | 8 | 0.0454545 | 1.0472 | 30 | 30 |
| 148 | 8 | 0.0454545 | 1.5708 | 30 | 30 |
| 149 | 8 | 0.0454545 | 2.09439 | 30 | 30 |
| 150 | 8 | 0.0454545 | 2.61799 | 30 | 30 |
| 151 | 8 | 0.0909091 | 0 | 30 | 30 |
| 152 | 8 | 0.0909091 | 0.523598 | 30 | 30 |
| 153 | 8 | 0.0909091 | 1.0472 | 30 | 30 |
| 154 | 8 | 0.0909091 | 1.5708 | 30 | 30 |
| 155 | 8 | 0.0909091 | 2.09439 | 30 | 30 |
| 156 | 8 | 0.0909091 | 2.61799 | 30 | 30 |
| 157 | 8 | 0.0454545 | 0 | 30 | 42 |
| 158 | 8 | 0.0454545 | 0.523598 | 30 | 42 |
| 159 | 8 | 0.0454545 | 1.0472 | 30 | 42 |
| 160 | 8 | 0.0454545 | 1.5708 | 30 | 42 |
| 161 | 8 | 0.0454545 | 2.09439 | 30 | 42 |
| 162 | 8 | 0.0454545 | 2.61799 | 30 | 42 |
| 163 | 8 | 0.0909091 | 0 | 30 | 42 |
| 164 | 8 | 0.0909091 | 0.523598 | 30 | 42 |
| 165 | 8 | 0.0909091 | 1.0472 | 30 | 42 |
| 166 | 8 | 0.0909091 | 1.5708 | 30 | 42 |
| 167 | 8 | 0.0909091 | 2.09439 | 30 | 42 |
| 168 | 8 | 0.0909091 | 2.61799 | 30 | 42 |
| 169 | 8 | 0.0454545 | 0 | 30 | 54 |
| 170 | 8 | 0.0454545 | 0.523598 | 30 | 54 |
| 171 | 8 | 0.0454545 | 1.0472 | 30 | 54 |
| 172 | 8 | 0.0454545 | 1.5708 | 30 | 54 |
| 173 | 8 | 0.0454545 | 2.09439 | 30 | 54 |
| 174 | 8 | 0.0454545 | 2.61799 | 30 | 54 |
| 175 | 8 | 0.0909091 | 0 | 30 | 54 |
| 176 | 8 | 0.0909091 | 0.523598 | 30 | 54 |
| 177 | 8 | 0.0909091 | 1.0472 | 30 | 54 |
| 178 | 8 | 0.0909091 | 1.5708 | 30 | 54 |
| 179 | 8 | 0.0909091 | 2.09439 | 30 | 54 |
| 180 | 8 | 0.0909091 | 2.61799 | 30 | 54 |
| 181 | 8 | 0.0454545 | 0 | 42 | 6 |
| 182 | 8 | 0.0454545 | 0.523598 | 42 | 6 |
| 183 | 8 | 0.0454545 | 1.0472 | 42 | 6 |
| 184 | 8 | 0.0454545 | 1.5708 | 42 | 6 |
| 185 | 8 | 0.0454545 | 2.09439 | 42 | 6 |
| 186 | 8 | 0.0454545 | 2.61799 | 42 | 6 |
| 187 | 8 | 0.0909091 | 0 | 42 | 6 |
| 188 | 8 | 0.0909091 | 0.523598 | 42 | 6 |
| 189 | 8 | 0.0909091 | 1.0472 | 42 | 6 |
| 190 | 8 | 0.0909091 | 1.5708 | 42 | 6 |
| 191 | 8 | 0.0909091 | 2.09439 | 42 | 6 |
| 192 | 8 | 0.0909091 | 2.61799 | 42 | 6 |
| 193 | 8 | 0.0454545 | 0 | 42 | 18 |
| 194 | 8 | 0.0454545 | 0.523598 | 42 | 18 |
| 195 | 8 | 0.0454545 | 1.0472 | 42 | 18 |
| 196 | 8 | 0.0454545 | 1.5708 | 42 | 18 |
| 197 | 8 | 0.0454545 | 2.09439 | 42 | 18 |
| 198 | 8 | 0.0454545 | 2.61799 | 42 | 18 |
| 199 | 8 | 0.0909091 | 0 | 42 | 18 |
| 200 | 8 | 0.0909091 | 0.523598 | 42 | 18 |
| 201 | 8 | 0.0909091 | 1.0472 | 42 | 18 |
| 202 | 8 | 0.0909091 | 1.5708 | 42 | 18 |
| 203 | 8 | 0.0909091 | 2.09439 | 42 | 18 |

TABLE 1-continued

| index | $\sigma_i$ | $1/\lambda_i$ | $\alpha_i$ | $Cx_i$ | $Cy_i$ |
|---|---|---|---|---|---|
| 204 | 8 | 0.0909091 | 2.61799 | 42 | 18 |
| 205 | 8 | 0.0454545 | 0 | 42 | 30 |
| 206 | 8 | 0.0454545 | 0.523598 | 42 | 30 |
| 207 | 8 | 0.0454545 | 1.0472 | 42 | 30 |
| 208 | 8 | 0.0454545 | 1.5708 | 42 | 30 |
| 209 | 8 | 0.0454545 | 2.09439 | 42 | 30 |
| 210 | 8 | 0.0454545 | 2.61799 | 42 | 30 |
| 211 | 8 | 0.0909091 | 0 | 42 | 30 |
| 212 | 8 | 0.0909091 | 0.523598 | 42 | 30 |
| 213 | 8 | 0.0909091 | 1.0472 | 42 | 30 |
| 214 | 8 | 0.0909091 | 1.5708 | 42 | 30 |
| 215 | 8 | 0.0909091 | 2.09439 | 42 | 30 |
| 216 | 8 | 0.0909091 | 2.61799 | 42 | 30 |
| 217 | 8 | 0.0454545 | 0 | 42 | 42 |
| 218 | 8 | 0.0454545 | 0.523598 | 42 | 42 |
| 219 | 8 | 0.0454545 | 1.0472 | 42 | 42 |
| 220 | 8 | 0.0454545 | 1.5708 | 42 | 42 |
| 221 | 8 | 0.0454545 | 2.09439 | 42 | 42 |
| 222 | 8 | 0.0454545 | 2.61799 | 42 | 42 |
| 223 | 8 | 0.0909091 | 0 | 42 | 42 |
| 224 | 8 | 0.0909091 | 0.523598 | 42 | 42 |
| 225 | 8 | 0.0909091 | 1.0472 | 42 | 42 |
| 226 | 8 | 0.0909091 | 1.5708 | 42 | 42 |
| 227 | 8 | 0.0909091 | 2.09439 | 42 | 42 |
| 228 | 8 | 0.0909091 | 2.61799 | 42 | 42 |
| 229 | 8 | 0.0454545 | 0 | 42 | 54 |
| 230 | 8 | 0.0454545 | 0.523598 | 42 | 54 |
| 231 | 8 | 0.0454545 | 1.0472 | 42 | 54 |
| 232 | 8 | 0.0454545 | 1.5708 | 42 | 54 |
| 233 | 8 | 0.0454545 | 2.09439 | 42 | 54 |
| 234 | 8 | 0.0454545 | 2.61799 | 42 | 54 |
| 235 | 8 | 0.0909091 | 0 | 42 | 54 |
| 236 | 8 | 0.0909091 | 0.523598 | 42 | 54 |
| 237 | 8 | 0.0909091 | 1.0472 | 42 | 54 |
| 238 | 8 | 0.0909091 | 1.5708 | 42 | 54 |
| 239 | 8 | 0.0909091 | 2.09439 | 42 | 54 |
| 240 | 8 | 0.0909091 | 2.61799 | 42 | 54 |
| 241 | 8 | 0.0454545 | 0 | 54 | 6 |
| 242 | 8 | 0.0454545 | 0.523598 | 54 | 6 |
| 243 | 8 | 0.0454545 | 1.0472 | 54 | 6 |
| 244 | 8 | 0.0454545 | 1.5708 | 54 | 6 |
| 245 | 8 | 0.0454545 | 2.09439 | 54 | 6 |
| 246 | 8 | 0.0454545 | 2.61799 | 54 | 6 |
| 247 | 8 | 0.0909091 | 0 | 54 | 6 |
| 248 | 8 | 0.0909091 | 0.523598 | 54 | 6 |
| 249 | 8 | 0.0909091 | 1.0472 | 54 | 6 |
| 250 | 8 | 0.0909091 | 1.5708 | 54 | 6 |
| 251 | 8 | 0.0909091 | 2.09439 | 54 | 6 |
| 252 | 8 | 0.0909091 | 2.61799 | 54 | 6 |
| 253 | 8 | 0.0454545 | 0 | 54 | 18 |
| 254 | 8 | 0.0454545 | 0.523598 | 54 | 18 |
| 255 | 8 | 0.0454545 | 1.0472 | 54 | 18 |
| 256 | 8 | 0.0454545 | 1.5708 | 54 | 18 |
| 257 | 8 | 0.0454545 | 2.09439 | 54 | 18 |
| 258 | 8 | 0.0454545 | 2.61799 | 54 | 18 |
| 259 | 8 | 0.0909091 | 0 | 54 | 18 |
| 260 | 8 | 0.0909091 | 0.523598 | 54 | 18 |
| 261 | 8 | 0.0909091 | 1.0472 | 54 | 18 |
| 262 | 8 | 0.0909091 | 1.5708 | 54 | 18 |
| 263 | 8 | 0.0909091 | 2.09439 | 54 | 18 |
| 264 | 8 | 0.0909091 | 2.61799 | 54 | 18 |
| 265 | 8 | 0.0454545 | 0 | 54 | 30 |
| 266 | 8 | 0.0454545 | 0.523598 | 54 | 30 |
| 267 | 8 | 0.0454545 | 1.0472 | 54 | 30 |
| 268 | 8 | 0.0454545 | 1.5708 | 54 | 30 |
| 269 | 8 | 0.0454545 | 2.09439 | 54 | 30 |
| 270 | 8 | 0.0454545 | 2.61799 | 54 | 30 |
| 271 | 8 | 0.0909091 | 0 | 54 | 30 |
| 272 | 8 | 0.0909091 | 0.523598 | 54 | 30 |
| 273 | 8 | 0.0909091 | 1.0472 | 54 | 30 |
| 274 | 8 | 0.0909091 | 1.5708 | 54 | 30 |
| 275 | 8 | 0.0909091 | 2.09439 | 54 | 30 |
| 276 | 8 | 0.0909091 | 2.61799 | 54 | 30 |
| 277 | 8 | 0.0454545 | 0 | 54 | 42 |
| 278 | 8 | 0.0454545 | 0.523598 | 54 | 42 |
| 279 | 8 | 0.0454545 | 1.0472 | 54 | 42 |
| 280 | 8 | 0.0454545 | 1.5708 | 54 | 42 |
| 281 | 8 | 0.0454545 | 2.09439 | 54 | 42 |
| 282 | 8 | 0.0454545 | 2.61799 | 54 | 42 |
| 283 | 8 | 0.0909091 | 0 | 54 | 42 |
| 284 | 8 | 0.0909091 | 0.523598 | 54 | 42 |
| 285 | 8 | 0.0909091 | 1.0472 | 54 | 42 |
| 286 | 8 | 0.0909091 | 1.5708 | 54 | 42 |
| 287 | 8 | 0.0909091 | 2.09439 | 54 | 42 |
| 288 | 8 | 0.0909091 | 2.61799 | 54 | 42 |
| 289 | 8 | 0.0454545 | 0 | 54 | 54 |
| 290 | 8 | 0.0454545 | 0.523598 | 54 | 54 |
| 291 | 8 | 0.0454545 | 1.0472 | 54 | 54 |
| 292 | 8 | 0.0454545 | 1.5708 | 54 | 54 |
| 293 | 8 | 0.0454545 | 2.09439 | 54 | 54 |
| 294 | 8 | 0.0454545 | 2.61799 | 54 | 54 |
| 295 | 8 | 0.0909091 | 0 | 54 | 54 |
| 296 | 8 | 0.0909091 | 0.523598 | 54 | 54 |
| 297 | 8 | 0.0909091 | 1.0472 | 54 | 54 |
| 298 | 8 | 0.0909091 | 1.5708 | 54 | 54 |
| 299 | 8 | 0.0909091 | 2.09439 | 54 | 54 |
| 300 | 8 | 0.0909091 | 2.61799 | 54 | 54 |

The invention claimed is:

1. A method for identifying a pattern in an input image, comprising the steps of
   a) normalizing the input image to a normalized matrix representing a normalized image,
   b) generating an image vector from the normalized matrix,
   c) multiplying the image vector with a sparse matrix using a matrix vector multiplication to generate a feature vector wherein the sparse matrix is generated from a Gabor function which is a sinusoidal wave multiplied by a Gaussian function and wherein the Gabor function is a function of at least one variable indicating a position in the normalized matrix and of a set of parameters including a parameter related to the direction of the sinusoidal wave, a parameter related to a centre of the Gabor function, and a parameter related to a wavelength of the sinusoidal wave,
   d) creating with the feature vector a density of probability for a predetermined list of models,
   e) selecting the model with the highest density of probability as the best model, and
   f) classifying the best model as the pattern of the input image,
   wherein there are at least two centres of the Gabor function, and
   wherein the wavelength takes at least two values, with a first wavelength value lower than or substantially equal to the distance between two adjacent centres of the Gabor function, and the first wavelength value is lower than a second wavelength value and higher than or substantially equal to half the second wavelength value
   wherein the models are characterized by a covariance matrix and by an average vector,
   wherein the density of probability is calculated by the formula $$p(r) = \frac{1}{\sqrt{(2\pi)^k |\Sigma|}} \exp\left[-\frac{(r-\mu)^t \sum (r-\mu)}{2}\right],$$

wherein the symbol r represents the feature vector, the symbol $\Sigma$ represents the covariance matrix, the symbol $\mu$ represents the average vector and k is equal to the number of elements of the feature vector, wherein the set of parameters of the Gabor function includes the standard deviation of the Gaussian function which takes values lower than the distance between two adjacent centres of the Gabor function and higher than the half distance between two adjacent centres of the Gabor function.

2. A method according to claim 1, wherein all non-diagonal elements of the covariance matrix are zero.

3. A method according to claim 1, wherein the parameter related to the direction of the sinusoidal wave is an angle.

4. A method according to claim 1, with at least two parameters related to a centre of the Gabor function,
wherein the parameters related to a centre of the Gabor function are such that the centres of the Gabor function are regularly spaced.

5. A method according to claim 1, wherein the feature vector is approximated.

6. A computer program product comprising a non-transitory computer readable medium having control logic stored therein for causing a computing device to identify a pattern in an input image, the control logic comprising:
a) first computer readable program code means for normalizing the input image to a normalized matrix representing a normalized image,
b) second computer readable program code means for generating an image vector from the normalized matrix,
c) third computer readable program code means for multiplying the image vector with a sparse matrix using a matrix vector multiplication to generate a feature vector wherein the sparse matrix (303) is generated from a Gabor function which is a sinusoidal wave multiplied by a Gaussian function and wherein the Gabor function is a function of at least one variable indicating a position in the normalized matrix and of a set of parameters including a parameter related to the direction of the sinusoidal wave, a parameter related to a centre of the Gabor function, and a parameter related to a wavelength of the sinusoidal wave,
d) fourth computer readable program code means for creating with the feature vector a density of probability for a predetermined list of models,
e) fifth computer readable program code means for selecting the model with the highest density of probability as the best model, and
f) sixth computer readable program code means for classifying the best model as the pattern of the input image,
wherein there are at least two centres of the Gabor function, and
wherein the wavelength takes at least two values, with a first wavelength value lower than or substantially equal to the distance between two adjacent centres of the Gabor function, and the first wavelength value is lower than a second wavelength value and higher than or substantially equal to half the second wavelength value
wherein the models are characterized by a covariance matrix and by an average vector, and wherein the density of probability is calculated by the formula $$p(r) = \frac{1}{\sqrt{(2\pi)^k |\Sigma|}} \exp\left[-\frac{(r-\mu)^t \Sigma (r-\mu)}{2}\right],$$

wherein the symbol r represents the feature vector, the symbol $\Sigma$ represents the covariance matrix, the symbol $\mu$ represents the average vector and k is equal to the number of elements of the feature vector,
wherein the set of parameters of the Gabor function includes the standard deviation of the Gaussian function which takes values lower than the distance between two adjacent centres of the Gabor function and higher than the half distance between two adjacent centres of the Gabor function.

* * * * *